Patented June 1, 1954

2,680,099

UNITED STATES PATENT OFFICE 2,680,099

MANUFACTURE OF SHAPED ALUMINA PARTICLES

James Hoekstra, Evergreen Park, Ill., assignor to Universal Oil Products Company, Chicago, Ill., a corporation of Delaware No Drawing. Application January 12, 1951, Serial No. 205,830

13 Claims. (Cl. 252—448)

This invention relates to the manufacture of shaped alumina particles and more particularly to an improvement in the process of manufacturing alumina particles of substantially spherical or spheroidal shape.

The use of alumina particles in substantially spherical or spheroidal shape offers numerous advantages, particularly when the alumina is used as an adsorbent, treating, refining or purifying agent, or as a catalyst or component of a catalyst for the conversion of organic compounds and still more particularly for the conversion of hydrocarbons. When used as a fixed bed of packing material in a reaction or contacting zone, the spheroidal shaped particles permit more uniform packing and thereby reduce variations in pressure drop through the bed and accordingly reduce channeling which otherwise results in a portion of the bed being by-passed. Another advantage to the use of particles of this shape is that the spheres contain no sharp edges to break or wear off during processing or handling and, therefore, the tendency to plug the process equipment is reduced. These advantages are magnified when the alumina particles are used as a moving bed, that is, when the particles are transported from one zone to another by either the reactants or by an extraneous carrying medium. It is thus seen that the use of particles of this shape permits a more effective utilization of the alumina.

In accordance with the present invention, alumina spheres are formed by reacting an alumina sol of particular properties with a suitable organic basic compound which results in the formation of alumina gels at an elevated temperature. In a preferred embodiment of the invention droplets of a mixture of the alumina sol and the organic basic compounds are passed into a water immiscible suspending medium and, during passage through the suspending medium, the droplets form into hydrogel spheres. The suspending medium preferably is maintained at an elevated temperature in order to accelerate conversion of the sol to a gel within a reasonable time. However, continued use of the suspending medium at the elevated temperature results in deterioration thereof in its properties to produce substantially spherical shaped gel particles. The interfacial tension between the suspending medium and the sol-organic basic compound decreases during this use and results in particles which are not substantially spherical but instead are flat or ellipsoidal.

Another disadvantage resulting from the continued use of the suspending medium at elevated temperatures in this process is that the suspending medium tends to be retained by the spheres to a greater extent than when using fresh suspending medium. This results in a film of suspending medium on the gel particles and interferes with subsequent treatment of the gel particles with aqueous solutions. The film of suspending medium prevents efficient contact between the aqueous solution and the gel particles with the result that either a poorer product is obtained or more aqueous solution is required to effect the desired treatment.

The present invention is directed to a novel method of restoring the desired properties to the suspending medium and thereby to permit the use of the suspending medium for considerably longer periods of time than otherwise, with the resultant increased efficiency and improved economics of the sphere manufacture process.

In one embodiment the present invention relates to a process for the manufacture of shaped alumina particles by converting an alumina sol into hydrogel within a water immiscible suspending medium, wherein the interfacial tension between said sol and said suspending medium decreases with use, which comprises withdrawing at least a portion of said suspending medium and contacting the same first with a siliceous material and then with alumina, thereby recovering a renewed suspending medium for further use in said process.

In a specific embodiment the present invention relates to a process for the manufacture of alumina spheres which comprises introducing droplets of an alumina sol and hexamethylene tetramine into an oil bath maintained at an elevated temperature and therein causing the droplets to set to hydrogel spheres, aging said hydrogel spheres in contact with oil at an elevated temperature, withdrawing at least a portion of the oil from at least one of said first mentioned and said second mentioned oils and contacting the withdrawn oil first with a bed of silica-alumina and then with a bed of alumina, and recovering a renewed oil for reuse in said process.

The alumina sol for use in accordance with the present invention may comprise any suitable alumina sol and preferably contains an aluminum to chlorine atomic ratio of greater than 1:3. A preferred method of manufacturing the alumina sol comprises heating and digesting an aqueous solution of aluminum chloride with aluminum metal. In general this digesting temperature will range from about 175° to about 220° F. and for a time ranging from about 24 to 72 hours or more. It also is generally preferred that the ratio of aluminum chloride to aluminum metal is within the range of from about 1:3 to about 1:5. In some cases other aluminum salts such as aluminum nitrate, etc. may be utilized in place of aluminum chloride but not necessarily with equivalent results.

Any suitable organic basic compound which reacts with the alumina sol under the conditions of treatment to form alumina hydrogel may be utilized in accordance with the present invention. A preferred compound comprises hexamethylene tetramine. Other organic basic compounds which may be utilized but not necessarily with equivalent results include the reaction product of ammonia with acetaldehyde, propionaldehyde, etc., or ammonium acetate and preferably a mixture of ammonium acetate and ammonium hydroxide, the mixture having a pH of below about 8.5, etc.

As hereinbefore set forth, hexamethylene tetramine is preferred and preferably is prepared as an aqueous solution containing from about 15% to about 40% by weight of hexamethylene tetramine for ease in handling and also because solutions within this range have been found to result in more firm gel spheres. The solution of alumina sol and the solution of hexamethylene tetramine are commingled and, in accordance with the present invention, droplets thereof are passed in a water immiscible suspending medium. In general it is preferred to use equal proportions of the sol solution and the hexamethylene tetramine solution. However, it is understood that the ratios of these solutions may very considerably and thus may range up to about 5 volumes or more of one solution per one volume of the other solution.

Any suitable water immiscible suspending medium may be used which will not vaporize at the temperature employed. A particularly suitable suspending medium comprises hydrocarbon oil including kerosene, gas oil, Nujol, etc. It generally is preferred to utilize a suspending medium which has a density of less than that of the droplets of the sol so that the sol may be dropped into the top of the suspending medium and withdrawn from the bottom thereof. However, it is understood that a suspending medium having a higher density than the droplets may be employed, with the droplets being introduced into the bottom of a confined body of the suspending medium and the spheres will slowly rise to the surface of the suspending medium, settling into hydrogel upon passage through the medium, and being withdrawn at the top of the suspending medium.

The mixed solutions of sol and hexamethylene tetramine may be maintained at room temperature and preferably below room temperature for a considerable time before gelation occurs. Upon passing droplets of the mixed solution of sol and hexamethylene tetramine into an oil bath maintained at an elevated tempertaure, gelation of the sol to hydrogel occurs. The suspending medium is maintained at a temperature of from about 120° to about 220° F. and preferably of from about 190° to about 210° F., and the volume of the suspending medium is sufficient to allow the required time for the droplets to set to firm hydrogel spheres.

In order to insure firm hydrogel spheres which will not disintegrate or crack upon further handling or contact with water, the spheres from the forming chamber preferably are aged in oil or in any other suitable non-aqueous medium at a temperature of from about 150° to about 212° F. for at least 10 hours and preferably from about 10 to about 24 hours. In one method of operation the spheres may be aged in the same oil utilized in the forming step of the process by circulating the oil and spheres from the forming zone into a separate zone wherein they are allowed to remain at the desired temperature for the desired time.

As hereinbefore set forth, the oil utilized in the forming and/or aging zones deteriorates with use and results in flat or ellipsoidal spheres. In accordance with the present invention oil withdrawn from the forming zone and/or from the aging zone is treated in a particular manner in order to restore the utility of the oil for further use in the process.

In accordance with the present invention at least a portion of the oil withdrawn from one or both of these sources is treated first with a siliceous material and then with alumina. For many uses and particularly in the manufacture of particular catalysts, the presence of silica and other impurities is undesirable. However, it has been found that in passing the oil through a bed of siliceous material, the oil adsorbs or otherwise retains silica or silicon compounds thereon. In accordance with the present invention siliceous material is removed by later contact with alumina.

Any suitable siliceous material may be employed in accordance with the present invention. While silica may be used, a preferred treating agent for this purpose comprises a composite of silica and alumina, which composite may be naturally occurring or synthetically prepared. Naturally occurring silica-alumina composites include Attapulgus clay, montmorillonite and particularly acid treated montmorillonite, etc. Synthetic silica-alumina composites include those presently referred to in the art as cracking catalysts and comprising a major proportion of silica and a minor proportion of alumina. These composites generally are prepared by forming silica by the reaction of water glass with an acid such as sulfuric acid, hydrochloric acid, etc., washing the resultant silica, and then compositing alumina therewith in any suitable manner. Silica-alumina composties are preferred but, in some cases, composites of silica with oxides of magnesium, zirconium, vanadium, thorium, etc. or mixtures thereof, alone or together with alumina, may be employed.

After the oil has been contacted with the siliceous material, it then is contacted with the alumina. Any suitable alumina may be utilized in accordance with the present invention but preferably comprises alumina which is substantially free from siliceous components. A particularly suitable alumina for use in accordance with the present invention comprises the alumina spheres formed in the present process. The alumina serves to remove siliceous and other undesirable components from the oil and thus will avoid the possible retention of silica or other undesirable components in the alumina spheres when the oil is reused in the process.

Treatment of the oil with the siliceous material and with the alumina may be effected at any suitable temperature ranging from room temperature to about 500° F., and preferably at a temperature of from about 200° to about 400° F. Temperatures above about 500° F. are to be avoided because undesirable chemical reactions occur at higher temperatures.

The reason for deterioration of the oil during use in the forming and aging steps of the process has not been completely determined but is believed to result from several causes. Heating and maintaining the oil at the elevated temperature tends to effect chemical reactions which result in undesirable changes to the oil. In addition, the oil may physically retain undesirable components included in the reactants charged to the process and this also may serve to detrimentally affect the oil.

Treatment with the siliceous material and alumina may be effected in any suitable manner. In a preferred method a bed of the siliceous material is disposed above a bed of alumina, and the oil is passed downwardly through the siliceous material and then through the alumina. When desired, these beds may be reversed and the oil passed upwardly therethrough. In another embodiment the oil may be passed through a bed of or slurried with the siliceous material, the oil separated therefrom, and the partially treated oil then passed through a bed of or slurried with the alumina, and subsequently separated therefrom. In any event the oil is contacted with the siliceous material and alumina for a sufficient time to effect the desired treatment of the oil. After treatment in the manner herein set forth, the oil is recycled for further use in the forming step of the process.

The alumina spheres as formed in the manner hereinbefore set forth preferably are further aged in contact with a basic solution and particularly a dilute solution of ammonium hydroxide. This serves to further strengthen the spheres and also to result in spheres of lower density. As will be shown in one of the following examples, spheres formed in used oil have a higher apparent bulk density than spheres formed in fresh oil. This, therefore, shows that the used oil also detrimentally affects the aging treatment in ammonium hydroxide. It is believed that this is due to a film of oil formed on the spheres during the forming and/or oil aging steps. The oil retention by the spheres formed in used oil appears to be greater than that obtained when using fresh oil. Treatment of the oil in the manner hereinbefore set forth will serve to improve the subsequent ammonium hydroxide aging of the spheres.

The spheres, depending upon their subsequent use, may be dried at a temperature of from about 200° to 500° F. or more for a period of from about 2 to about 24 hours or more and, when desired, may be calcined at a temperature of from about 800° to 1200° F. or more for a period of from about 2 to 12 hours or more.

Spheres formed in the above manner will have many uses including use as adsorbents, refining or purifying agents, catalysts and particularly as a component in a catalyst for the reforming of gasoline or naphtha to improve the antiknock properties thereof. When utilized for the reforming of gasoline or naphtha, the spheres are composited with platinum and combined halogen. The platinum is utilized in a concentration of from about 0.01% to about 1% by weight and generally will be added as a solution of chloroplatinic acid or other suitable platinum solution. The halogen preferably comprises fluorine and/or chlorine, and preferably is added as a solution of hydrogen fluoride and/or hydrogen chloride, the amount of halogen being within the range of from about 0.1% to about 8% by weight.

When desired, the spheres may be composited with one or more of the elements or compounds and particularly oxides or groups 4, 5, 6 and 8 of the periodic table, and the resultant catalyst may be utilized for various reactions including reforming, hydrogenation, dehydrogenation, desulfurization, oxidation, etc. of hydrocarbons or other organic compounds.

It is understood that the other components may be composited with the alumina either prior or subsequent to the drying and/or calcining of the alumina. When the components are composited with the spheres subsequent to drying and calcining thereof, it is understood that the composite catalyst may then be further dried and calcined as desired and preferably at substantially the same conditions as hereinbefore set forth.

The following examples are introduced to illustrate further the novelty and utility of the present invention but not with the intention of unduly limiting the same.

*Example I*

The suspending medium used in this example was a medicinal grade mineral oil commonly referred to as Nujol. The Nujol had an initial interfacial tension of 51.8 dynes/cm. against water. The interfacial tensions referred to in the present specification and claims are determined according to ASTM Method D971-48T—Interfacial Tension of Oil Against Water by the Ring Method.

The oil was used in the manufacture of alumina pellets by dropping a mixture of alumina sol solution and hexamethylene tetramine solution into the oil maintained at a temperature of 200° F. and the oil then was used in the aging of the spheres at a temperature of about 205° F. for 16 hours. After use for several weeks, the interfacial tension of the oil against water dropped to 7.3 dynes/cm.

*Example II*

A sample of the fresh oil and a sample of the used oil referred to in Example I were then used for making batches of alumina pellets under identical conditions. The ratio of the major to the minor diameter of the pellets produced in the fresh oil was 1.17 which, as readily seen, is substantially spherical. The corresponding ratio of the pellets produced in the used oil was 2.15, thereby showing that the pellets formed in the used oil no longer were substantially spherical but were distorted.

*Example III*

The pellets produced in the fresh oil and those produced in the used oil as described in Example II were each separately aged in dilute ammonium hydroxide solutions of the same concentration for 16 hours, dried at 300° F. and calcined at 1200° F. The apparent bulk density of the pellets formed in the fresh oil was 0.278 g./cc., while the density of the pellets formed in the used oil was 0.524 g./cc. As hereinbefore set forth, one of the effects of the ammonium hydroxide treatment is to reduce the density of the pellets. Therefore, since both batches of pellets were treated in the same manner except for the difference in oils used, it is clear that the deteriorated oil further exerted a detrimental effect on the spheres insofar as the ammonium hydroxide treatment is concerned. As hereinbefore set forth, this is believed to be due to the oil film which adheres to the pellets and, as shown by this example, is greater and more detrimental when employing used oil.

*Example IV*

The oil used in this example was a Pennsylvania light spindle oil having an API gravity at 60° F. of 33° and a boiling range of from 640° to 739° F. The fresh oil had an interfacial tension against water of 28.8 dynes/cm.

The oil after subjection for 76 hours to the conditions encountered in the manufacture of alumina pellets by the methods hereinbefore set forth decreased in interfacial tension to 18.8. A portion of the deteriorated oil was treated with 30–60 mesh Attapulgus clay at 80° F. and it was found that, after treatment of 36 volumes of oil per volume of clay, the interfacial tension of the treated oil was 28.3 but that the treated oil contained 40 parts per million of silica.

When using the alumina spheres for the manufacture of the reforming catalyst hereinbefore referred to, the presence of silica is objectionable. As a means of eliminating the silica but still obtaining an improved oil which will be satisfactory for further use, another portion of the deteriorated oil was treated with 2 volumes of 30–60 mesh Attapulgus clay and then with one volume of alumina powder at 200° F. After treatment of 7 volumes of oil per volume of total treating materials, the silica content of the oil was less than 2 parts per million and the interfacial tension of the oil was 39.4 dynes/cm. After treatment of 36 volumes of oil per volume of treating materials, the interfacial tension of the oil was 29.6.

The clay and alumina were utilized as beds of treating agents with the clay positioned above the alumina, and the oil was passed downwardly through the treating materials. It will be noted that treatment of the oil with clay and then with alumina served to improve the interfacial tension of the oil and also to produce an oil substantially free from silica.

*Example V*

Oil used in the manufacture of alumina spheres by the method hereinbefore set forth had a usable life of about 8 days in a pilot plant operation, at which time the interfacial tension had dropped to about 18–20. It appears that the critical value of interfacial tension is of the order of 20 dynes/cm. and that oil having an interfacial tension below this number is unsatisfactory while oil having an interfacial tension above this number is satisfactory for use in the preparation of substantially spherical particles.

Upon treating a portion of the oil used in the process first with clay and then with alumina, the oil has been used in the plant for 21 days to date, and the oil still has an interfacial tension of 33 dynes/cm.

It is thus seen that the novel feature of the present invention serves to considerably prolong the useful life of the oil and results in a definite economy in the plant by reducing the amount of fresh oil required, as well as reducing the amount of oil to be disposed of.

*Example VI*

A portion of the oil referred to in the previous examples was treated with sulfuric acid in proportions equal to 10 pounds of 98% sulfuric acid per barrel of oil, followed by washing with caustic, washing with water and filtering. The resultant product was an emulsion which could not readily be broken. Therefore, this method of treatment is not at all satisfactory.

The same treatment was repeated but instead the sulfuric acid was used on the basis of 50 pounds of acid per barrel of oil. The results were the same in that a tight emulsion was formed.

Liquid phosphoric acid was used in another attempt to rectify the oil. Two volumes of 85% phosphoric acid were used per volume of oil and in this case there was no phase separation, the phosphoric acid remaining dissolved in the oil. It is readily seen that this method likewise is unsatisfactory.

Due to the peculiar results obtained when using liquid acids, it appears that the oil during use in this process undergoes an unusual transformation as the oil assumes peculiar properties. Therefore, it is an essential feature of the present invention that such used oil be treated in the manner hereinbefore set forth in order that the oil may be reusable in the process.

I claim as my invention:

1. In a process for the manufacture of alumina spheres wherein an alumina sol is commingled with hexamethylene tetramine and droplets of the resultant mixture passed into a water immiscible suspending medium maintained at an elevated temperature, the improvement which comprises withdrawing at least a portion of said suspending medium from the process after the interfacial tension between said mixture and said suspending medium decreased to below about 20 dynes/cm., and passing the same first through a bed containing silica maintained at a temperature of from about 200° to about 400° F. and then through a bed of alumina maintained at a temperature of from about 200° to about 400° F., and recovering a renewed suspending medium having an interfacial tension above about 20 dynes/cm. for reuse in said process.

2. In a process for the manufacture of alumina spheres wherein an alumina sol is commingled with hexamethylene tetramine and droplets of the resultant mixture passed into a hydrocarbon oil maintained at an elevated temperature, and the resultant hydrogel particles aged in at least a portion of said hydrocarbon oil at an elevated temperature for at least 10 hours, the improvement which comprises withdrawing at least a portion of said hydrocarbon oil from the aging step and contacting the same first with silica-alumina at a temperature of from about 200° to about 400° F. and then with alumina at a temperature of from about 200° to about 400° F., and supplying the thus treated oil to the process for use in the manufacture of further alumina spheres.

3. In a process for the manufacture of alumina spheres wherein an alumina sol and hexamethylene tetramine are commingled and droplets of the resultant mixture passed into an oil bath maintained at an elevated temperature wherein the droplets set to hydrogel spheres, said hydrogel spheres aged in contact with oil at an elevated temperature for at least 10 hours, and the spheres separated from said oil, the improvement which comprises passing at least a portion of the oil separated from said spheres first through a bed of silica-alumina at a temperature of from about 200° to about 400° F. and then through a bed of alumina at a temperature of from about 200° to about 400° F., and supplying at least a portion of the thus treated oil to the process for further use in the manufacture of alumina spheres.

4. In a process for the manufacture of shaped alumina particles wherein an alumina sol is converted into hydrogel within a water-immiscible suspending medium maintained at an elevated temperature and wherein the interfacial tension between said sol and said suspending medium decreases with use, the improvement which comprises withdrawing at least a portion of said suspending medium from the process and contacting the same with silica at a temperature ranging from room temperature to about 500° F., thereafter contacting the suspending medium with alumina at a temperature ranging from room temperature to about 500° F., and recovering a renewed suspending medium for reuse in said process.

5. The improvement as defined in claim 4 further characterized in that the suspending medium is contacted with said silica and said alumina at a temperature of from about 200° to about 400° F.

6. The improvement as defined in claim 4 further characterized in that said silica is in the form of a composite of silica with alumina.

7. In a process for the manufacture of alumina spheres wherein an alumina sol is converted into hydrogel within a hydrocarbon oil maintained at an elevated temperature and wherein the interfacial tension between said sol and said oil decreases with use, the improvement which comprises withdrawing at least a portion of said oil from the process and contacting the same with silica at a temperature ranging from room temperature to about 500° F., thereafter contacting the oil with alumina at a temperature ranging from room temperature to about 500° F., and recovering a renewed oil for reuse in said process.

8. The improvement as defined in claim 6 further characterized in that the oil is contacted with said silica and said alumina at a temperature of from about 200° to about 400° F.

9. The improvement as defined in claim 7 further characterized in that said silica is in the form of a composite of silica with alumina.

10. In a process for the manufacture of shaped alumina particles wherein an alumina sol is commingled with an organic basic compound reactable therewith to form hydrogel particles, the resultant mixture passed in finely divided form into a water-immiscible suspending medium maintained at an elevated temperature, and said hydrogel particles aged in a water-immiscible suspending medium at an elevated temperature, the improvement which comprises withdrawing at least a portion of one of said suspending mediums from the process and contacting the same with silica at a temperature ranging from room temperature to about 500° F., thereafter contacting the suspending medium with alumina at a temperature ranging from room temperature to about 500° F., and recovering a renewed suspending medium for reuse in said process.

11. The improvement as defined in claim 10 further characterized in that said silica is in the form of a composite of silica with alumina.

12. In a process for the manufacture of shaped alumina particles wherein an alumina sol is commingled with an organic basic compound reactable therewith to form hydrogel particles, the resultant mixture passed in finely divided form into a hydrocarbon oil maintained at an elevated temperature, and said hydrogel particles aged in a hydrocarbon oil at an elevated temperature, the improvement which comprises withdrawing from the process at least a portion of the oil in which said hydrogel particles are aged and contacting the same with silica at a temperature ranging from room temperature to about 500° F., thereafter contacting the oil with alumina at a temperature ranging from room temperature to about 500° F., and recovering a renewed oil for reuse in said process.

13. The improvement as defined in claim 12 further characterized in that said silica is in the form of a composite of silica with alumina.

References Cited in the file of this patent
UNITED STATES PATENTS

| Number | Name | Date |
|---|---|---|
| 2,284,248 | Baker et al. | May 26, 1942 |
| 2,288,875 | D'Ouville | July 7, 1942 |
| 2,400,709 | Patrick | May 21, 1946 |
| 2,406,420 | Weiser | Aug. 27, 1946 |
| 2,471,000 | Messenger | May 24, 1949 |
| 2,529,310 | Richardson et al. | Nov. 7, 1950 |